United States Patent
Davis et al.

(10) Patent No.: US 10,956,304 B2
(45) Date of Patent: Mar. 23, 2021

(54) DYNAMIC DIAGNOSTIC CODE INSTRUMENTATION OVER A HISTORIC PROGRAM EXECUTION

(71) Applicant: Microsoft Technology Licensing, LLC, Redmond, WA (US)

(72) Inventors: Jackson Michael Davis, Carnation, WA (US); Patrick Lothian Nelson, Redmond, WA (US); Andrew R. Sterland, Issaquah, WA (US); Jordi Mola, Bellevue, WA (US); Del Myers, Seattle, WA (US); Leslie Yvette Richardson, Seattle, WA (US); Thomas Lai, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/258,291

(22) Filed: Jan. 25, 2019

(65) Prior Publication Data

US 2020/0242007 A1 Jul. 30, 2020

(51) Int. Cl.
*G06F 9/44* (2018.01)
*G06F 9/445* (2018.01)
(Continued)

(52) U.S. Cl.
CPC .......... *G06F 11/3664* (2013.01); *G06F 9/455* (2013.01); *G06F 11/366* (2013.01)

(58) Field of Classification Search
CPC ..... G06F 11/3664; G06F 9/445; G06F 11/366
See application file for complete search history.

(56) References Cited

U.S. PATENT DOCUMENTS 5,870,607 A 2/1999 Netzer
6,901,581 B1 5/2005 Schneider
(Continued)

FOREIGN PATENT DOCUMENTS

WO 2018071450 A1 4/2018

OTHER PUBLICATIONS

Armando Miraglia, Peeking into the Past: Efficient Checkpoint-assisted Time-traveling Debugging, 2016, pp. 455-464. https://ieeexplore.ieee.org/stamp/stamp.jsp?tp=&arnumber=7774543 (Year: 2016).*

(Continued)

*Primary Examiner* — Mongbao Nguyen
(74) *Attorney, Agent, or Firm* — Workman Nydegger

(57) ABSTRACT

Dynamically instrumenting code that executes based on a historic execution of a subject executable entity. Historic execution information for a subject executable entity is accessed. The historic execution information includes execution state information for at least one point in time in the historic execution the executable entity. Diagnostic code instruction(s) are identified, for instrumenting subject code instruction(s) of the executable entity. The subject code instruction(s) are virtually executed based at least on supplying the subject code instruction(s) with data from the historic execution information. While virtually executing the identified executable code instruction(s), the diagnostic code instruction(s) are also executed. The diagnostic code instruction(s) collecting diagnostic data regarding the virtual execution of the subject code instruction(s), or override at least one of a value or an execution behavior of the subject code instruction(s).

21 Claims, 3 Drawing Sheets

(51) Int. Cl.
 *G06F 11/36* (2006.01)
 *G06F 9/455* (2018.01)

(56) References Cited

U.S. PATENT DOCUMENTS

| | | | |
|---|---|---|---|
| 7,464,373 B1 | 12/2008 | Yunt et al. | |
| 8,442,941 B2* | 5/2013 | Yao | G06F 11/3414 |
| | | | 707/610 |
| 9,092,332 B2* | 7/2015 | Taylor | G06F 11/3466 |
| 9,898,385 B1* | 2/2018 | O'Dowd | G06F 11/00 |
| 9,959,194 B1 | 5/2018 | Mola | |
| 10,120,781 B2* | 11/2018 | Hu | G06F 11/366 |
| 10,133,653 B2* | 11/2018 | O'Riordan | G06F 11/3476 |
| 10,509,694 B2* | 12/2019 | Sivalingam | G06F 11/0709 |
| 2007/0006159 A1* | 1/2007 | Hecht | G06F 11/3644 |
| | | | 717/124 |
| 2010/0125834 A1 | 5/2010 | Matic | |
| 2010/0299655 A1* | 11/2010 | Heisch | G06F 11/3409 |
| | | | 717/130 |
| 2013/0227350 A1* | 8/2013 | O'Riordan | G06F 11/3636 |
| | | | 714/45 |
| 2015/0143344 A1* | 5/2015 | Davis | G06F 8/751 |
| | | | 717/129 |
| 2015/0378870 A1 | 12/2015 | Marron et al. | |
| 2016/0292061 A1 | 10/2016 | Marron et al. | |
| 2018/0024911 A1* | 1/2018 | Kruszewski | G06F 8/447 |
| | | | 717/125 |
| 2018/0101466 A1* | 4/2018 | O'Dowd | G06F 11/3664 |
| 2018/0300197 A1* | 10/2018 | Marron | G06F 11/0778 |
| 2019/0188106 A1* | 6/2019 | Takahashi | H03M 7/607 |
| 2019/0213355 A1* | 7/2019 | Raviv | G06F 11/3664 |
| 2019/0266068 A1* | 8/2019 | Raviv | G06F 8/33 |
| 2019/0370148 A1* | 12/2019 | Du | G06F 11/3664 |
| 2020/0257615 A1 | 8/2020 | Richardson et al. | |

OTHER PUBLICATIONS

Satish Narayanasamy, BugNet: Continuously Recording Program Execution for Deterministic Replay Debugging, 2005, pp. 1-12. https://cseweb.ucsd.edu/~calder/papers/ISCA-05-BugNet.pdf (Year: 2005).*

"Non Final Office Action Issued in U.S. Appl. No. 16/270,034", dated Feb. 6, 2020, 30 Pages.

"Final Office Action Issued in U.S. Appl. No. 16/270,034", dated May 14, 2020, 30 Pages.

"International Search Report and Written Opinion Issued in PCT Application No. PCT/US2019/068451", dated Apr. 6, 2020, 16 Pages.

"International Search Report and Written Opinion Issued in PCT Application No. PCT/US20/015502", dated May 27, 2020, 14 Pages.

* cited by examiner

DYNAMIC DIAGNOSTIC CODE INSTRUMENTATION OVER A HISTORIC PROGRAM EXECUTION

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors might be triggered by a vast variety of factors such as data inputs, user inputs, race conditions (e.g., when accessing shared resources), etc. Given the variety of triggers, undesired software behaviors can be rare and seemingly random, and extremely difficult reproduce. As such, it can be very time-consuming for a developer to identify a given undesired software behavior. Once an undesired software behavior has been identified, it can again be difficult to determine its root cause(s).

Developers may take several approaches to identify undesired software behaviors, and to then identify the location(s) in an application's source code that cause the undesired software behavior. For example, a developer might test different portions of an application's source code against different inputs (e.g., unit testing), might reason about the execution of an application's source code in a debugger (e.g., by setting breakpoints/watchpoints, by stepping through lines of code, might observe the applications' behaviors in a profiler), etc.

Additionally, or alternatively, a developer might insert diagnostic code into an application's source code. Diagnostic code generally generates diagnostic information (e.g., logs, timing data, etc.) that can be used to identify program execution behaviors. For example, diagnostic code might include trace statements (e.g., print statements), that generate log information such as variable value(s) at a given point in time, memory value(s) at a given point in time, an indication of when a given function has been called, an indication of when a given line of code has executed, an indication of when an iteration of given loop has executed, etc.

Since execution of diagnostic code—such as trace statements—negatively impacts application performance, and since generated diagnostic information consumes storage resources, developers often need to be selective about what diagnostic code is included or active an application that is to be deployed for production use. In addition, while the information generated by diagnostic code can be very helpful, such code needs to be determined by a developer up-front and added to an application's source code prior to the application's deployment. If the diagnostic code in a deployed application does not generate the diagnostic information needed to identify a given undesired software behaviors, or it's root cause, then developer may need to modify the diagnostic code in the application's source code and re-deploy the application. Re-deployment can include recompiling the application, re-deploying the application to a server, restarting the application, and the like. For large applications, and for applications that are in active production use, re-deploying an application can be time consuming and/or disruptive. In addition, if the undesired software behavior is rare, it may be some time before the undesired software behavior is repeated after re-deployment of the application. While diagnostic code can be very useful, in view of these drawbacks its use can be quite limited and/or inflexible in production environments.

BRIEF SUMMARY

At least some embodiments described herein address the foregoing limits and inflexibilities of use of diagnostic code by providing for dynamic code instrumentation over a historic program execution. In particular, the embodiments described herein enable diagnostic code—which was not originally included in a subject application's code—to be executed while re-executing the subject applications' code based on historic execution information. As such, this diagnostic code can be executed within the context of the subject application's prior execution state, in order to collect diagnostic information that was not originally generated by the subject application during its prior execution, or that would not have been generated by the subject application had it continued executing. As such, the embodiments described herein can enable the code that executes as part of an application to be instrumented with new diagnostic code, in order to provide new data about a prior execution of the application, without modifying the application itself. Thus, if an undesired software behavior occurred during a prior execution of the application, or if the undesired software behavior would have occurred should the prior execution have continued, the new diagnostic code might be able to provide insights into that undesired software behavior and/or its root cause. Additionally, or alternatively, the new diagnostic code might even override how the application's code would have normally executed based on the prior execution state (e.g., by overriding a historic data value, by overriding the historic outcome of a condition, by overriding the historic target of a branch, etc.), facilitating "what-if" analysis.

At least some embodiments described herein are directed to methods, systems, and computer program products that dynamically instrument code that executes based on a historic execution of a subject executable entity. For example, embodiments may be implemented at a computer system that includes one or more processors and a memory, and may include accessing historic execution information for a subject executable entity. The historic execution information can include execution state information for at least one point in time in the historic execution the executable entity. Embodiments may also include identifying one or more diagnostic code instructions for instrumenting one or more subject code instructions of the executable entity, and virtually executing the one or more subject code instructions of the executable entity. The virtual execution can be based at least on supplying the one or more subject code instructions of the executable entity with data from the historic execution information. Embodiments may also include, while virtually executing the one or more subject code instructions of the executable entity, executing the identified one or more diagnostic code instructions. Based on executing the identified one or more diagnostic code instructions, embodiments may include performing at least one of (i) collecting diagnostic data regarding the virtual execution of the one or more subject code instructions, (ii) or overriding at least one of a value or an execution behavior of the one or more subject code instructions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
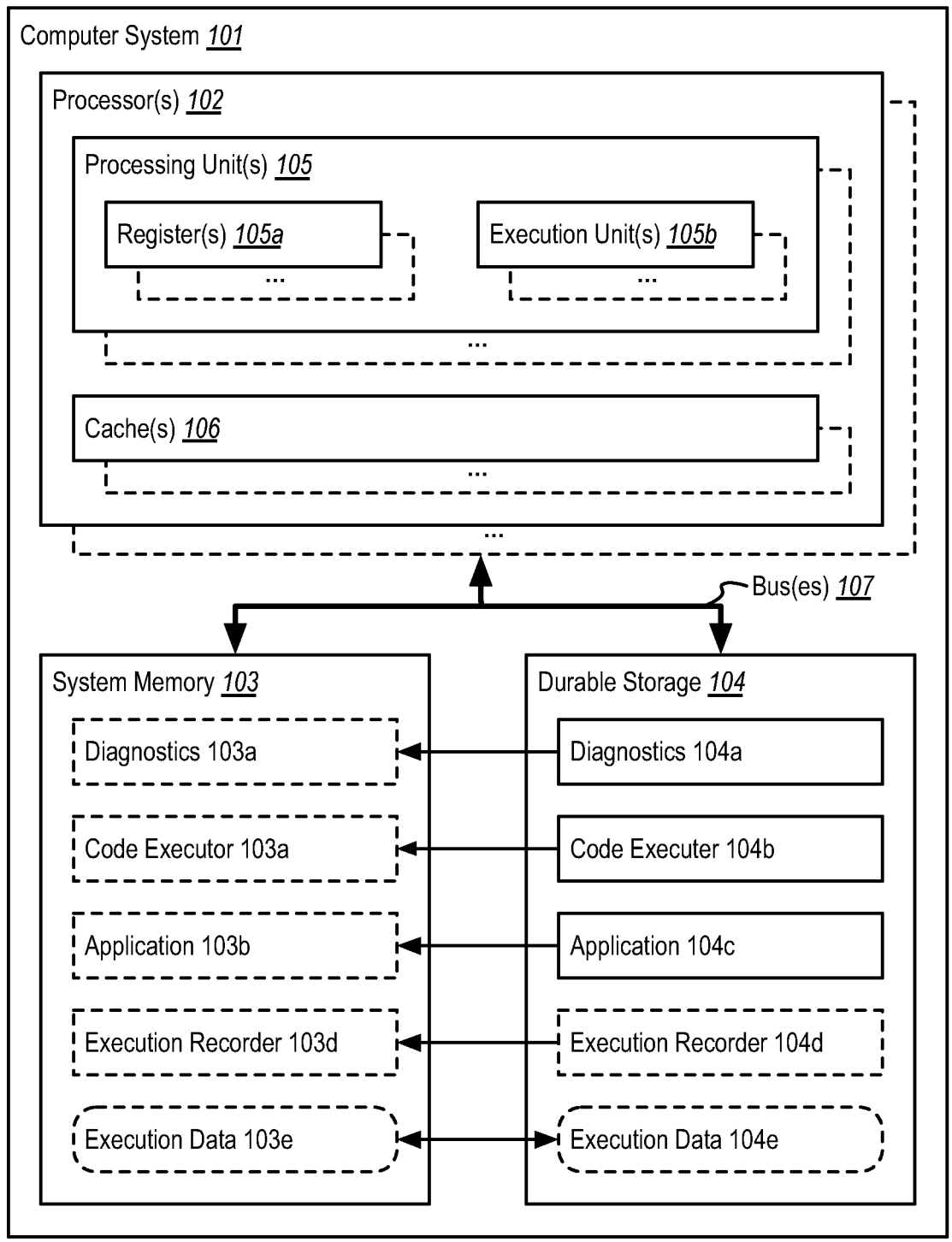
FIG. 1 illustrates an example computing environment that facilitates dynamic code instrumentation over a historic program execution.

At least some embodiments described herein address the foregoing limits and inflexibilities of use of diagnostic code by providing for dynamic code instrumentation over a historic program execution. In particular, the embodiments described herein enable diagnostic code—which was not originally included in a subject application's code—to be executed while re-executing the subject applications' code based on historic execution information. As such, this diagnostic code can be executed within the context of the subject application's prior execution state, in order to collect diagnostic information that was not originally generated by the subject application during its prior execution, or that would not have been generated by the subject application had it continued executing. As such, the embodiments described herein can enable the code that executes as part of an application to be instrumented with new diagnostic code, in order to provide new data about a prior execution of the application, without modifying the application itself. Thus, if an undesired software behavior occurred during a prior execution of the application, or if the undesired software behavior would have occurred should the prior execution have continued, the new diagnostic code might be able to provide insights into that undesired software behavior and/or its root cause. Additionally, or alternatively, the new diagnostic code might even override how the application's code would have normally executed based on the prior execution state (e.g., by overriding a historic data value, by overriding the historic outcome of a condition, by overriding the historic target of a branch, etc.), facilitating "what-if" analysis.

As mentioned, the embodiments herein provide dynamic code instrumentation over a historic program execution. In this description and the following claims, a "historic program execution," refers to any technique that executes one or more code instructions of one or more threads, based on data relating to a prior execution of those threads. A historic program execution might leverage any of a variety of historic debugging technologies. In general, historic debugging technologies record the execution state of one or more threads at various times, in order to enable execution of those threads to be at least partially virtually executed later from that recorded execution state. The fidelity of that virtual execution varies depending on what recorded execution state is available.

For example, one class of historic debugging technologies, referred to herein as time-travel debugging, records a bit-accurate trace of a thread's execution, which can then be used later to faithfully replay that thread's prior execution down to the fidelity of individual code instructions. In general, bit-accurate traces record information sufficient to reproduce initial processor state for at least one point in a thread's prior execution (e.g., by recording a snapshot of processor registers), along with the data values that were read by the thread's instructions as they executed after that point in time (e.g., the memory reads). This bit-accurate trace can then be used to replay execution of the thread's code instructions (starting with the initial processor state) based on supplying the instructions with the recorded reads.

Another class of historic debugging technology, referred to herein as branch trace debugging, rely on reconstructing at least part of thread's execution based on working backwards from a dump or snapshot (e.g., a crash dump) that includes a branch trace (i.e., which includes a record of whether or not branches were taken). These technologies start with values (e.g., memory and register) from this dump or snapshot and, using the branch trace to partially determine code execution flow, iteratively replay the thread's code instructions and backwards and forwards in order to reconstruct intermediary data values (e.g., register and memory) used by this code, until those values reach a steady state. These techniques may be limited in how far back they can reconstruct data values, and how many data values can be reconstructed. Nonetheless, the reconstructed historical execution data can be used for historic debugging.

Yet another class of historic debugging technology, referred to herein as replay and snapshot debugging, periodically record full snapshots of a thread's memory space and processor registers while it executes. If the thread relies on data from sources other than the thread's memory, or from a non-deterministic source, these technologies might also record such data along with the snapshots. These technologies then use the data in the snapshots to replay the execution of the thread's code between snapshots.

Generalizing, a historic program execution need only rely on historic state of a thread at a single point in time. For example, a historic program execution might be a single snapshot of a thread, from which execution of the thread can be replayed. Thus, for example, embodiments might even create a snapshot of a live thread, and then virtually execute the thread's instructions from that snapshot while the live thread continues to execute uninterrupted.

FIG. 1 illustrates an example computing environment 100 that facilitates dynamic code instrumentation over a historic program execution. As depicted, computing environment 100 may comprise or utilize a special-purpose or general-purpose computer system 101 that includes computer hardware, such as, for example, one or more processors 102, system memory 103, and durable storage 104, which are communicatively coupled using one or more communications buses 107.

As shown, each processor 102 can include (among other things) one or more processing units 105 (e.g., processor cores) and one or more caches 106. Each processing unit 105 loads and executes machine code instructions via the caches 106. During execution of these instructions at one more execution units 105b, the instructions can use internal processor registers 105a as temporary storage locations, and can read and write to various locations in system memory 103 via the caches 106. In general, the caches 106 temporarily cache portions of system memory 103; for example, caches 106 might include a "code" portion that caches portions of system memory 103 storing application code, and a "data" portion that caches portions of system memory 103 storing application runtime data. If a processing unit 105 requires data (e.g., code or application runtime data) not already stored in the caches 106, then the processing unit 105 can initiate a "cache miss," causing the needed data to be fetched from system memory 103—while potentially "evicting" some other data from the caches 106 back to system memory 103.

As illustrated, the durable storage 104 can store computer-executable instructions and/or data structures representing executable software such as, for example, a diagnostics component 104a, a code executor 104b, an application 104c, and an execution recorder 104d. System memory 103 correspondingly includes a diagnostics component 103a, a code executor 103b, an application 103c, and an execution recorder 103d—which represents code and data resident in system memory 103 during this software's execution at the processors 102. Durable storage 104 can also store data files, such as execution data 104e (all, or part, of which can also be resident in system memory 103 as execution data 103c).

In general, the diagnostics component 104a (e.g., a debugger, a profiler, etc.) is usable to provide dynamic code instrumentation over one or more historic executions of application 104c, as recorded into the execution data 103e. In doing so, the diagnostics component 104a works in connection with the code executer 104b to virtually execute code instructions from application 104c based on data stored in the execution data 103e. Thus, the code executer 104b can correspond to any component that can virtually execute code instructions, such as an interpreter (e.g., which interprets the execution of native machine code instructions) or a managed runtime environment (e.g., which virtually executes intermediate language instructions). To provide dynamic code instrumentation, the diagnostics component 104a also executes additional diagnostic code based on the execution data 104e. This additional diagnostic code can execute at code executer 104b, or on the processors 102 directly.

If included in computer system 101, the execution recorder 104d can record execution data 103e into system memory 103 based on execution of application 104c. This execution data 103e might include, for example, trace data enabling time-travel debugging, a dump or snapshot enabling branch trace debugging, a plurality of snapshots enabling replay and snapshot debugging, or a single snapshot (e.g., of a live process) from which a re-execution of the application's code can be performed. As shown, the execution data 103e might be persisted to durable storage 104 as execution data 104e. If the execution recorder 104d is not included in computer system 101, then execution data 103/e104e can be obtained from another computer system. Thus, diagnostics component 104a might provide dynamic code instrumentation over a historic execution of application 104c at computer system, or over a historic execution of application 104c at one or more other computer systems.

While diagnostics component 104a, code executer 104b, and/or execution recorder 104d might each be a standalone application (as shown), they might alternatively be integrated into the same application (such as a debugging suite), or might be integrated into another software component—such as an operating system component, a hypervisor, a cloud fabric, etc. As such, those skilled in the art will also appreciate that the invention may be practiced in a cloud computing environment of which computer system 101 is a part, such as to provide dynamic code instrumentation to debug an application 104c hosted within the cloud computing environment.

Figure 2:
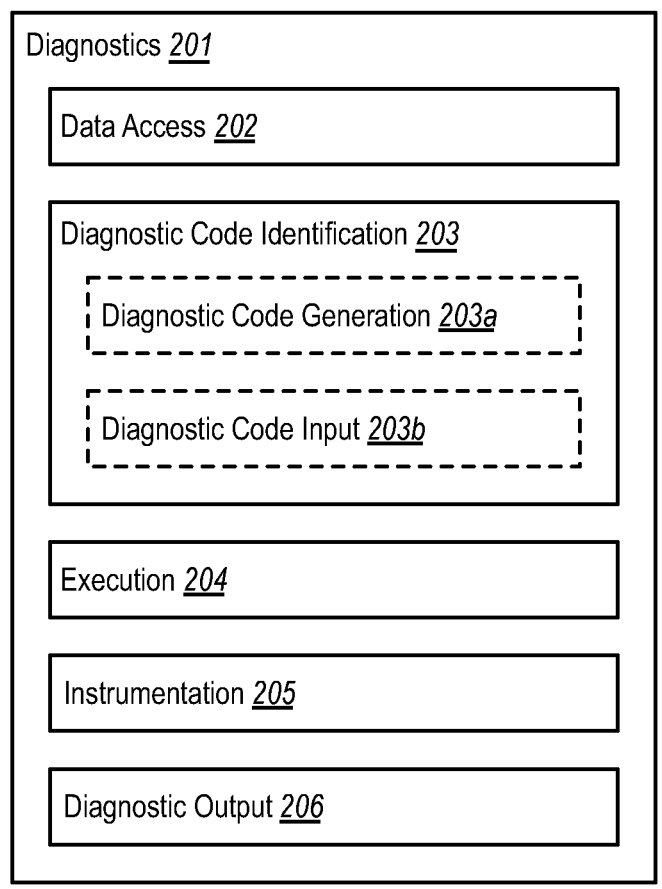
FIG. 2 illustrates an example of a diagnostics component that can be used to provide dynamic code instrumentation over one or more historic executions, in order to execute additional diagnostic code that was not present during an original historic execution.

FIG. 2 illustrates an example 200 of a diagnostics component 201 (e.g., corresponding to diagnostics component 104a of FIG. 1) that can be used to provide dynamic code instrumentation over one or more historic executions (e.g., of application 104c), in order to execute additional diagnostic code that was not present during the original historic execution. As depicted, the diagnostics component 201 includes a variety of components (e.g., data access 202, diagnostic code identification 203, execution 204, instrumentation 205, diagnostic output 206, etc.) that represent various functionality the diagnostics component 201 might implement in accordance with various embodiments described herein. It will be appreciated that these components—including their identity and arrangement—are depicted merely as an aid in describing various embodiments of the diagnostics component 201 described herein, and that these components are non-limiting to how software and/or hardware might implement various embodiments of the diagnostics component 201 described herein, or of the particular functionality thereof.

The data access component 202 accesses historic data (e.g., execution data 103e/104e), which includes execution state information for at least one point in time in a historic execution of an application (e.g., application 104c) that is the subject of debugging. For example, the data access component 202 might access trace data enabling time-travel debugging, a dump or snapshot enabling branch trace debugging, a plurality of snapshots enabling replay and snapshot debugging, or a single snapshot (e.g., of a live process) from which a re-execution of an application's code can be performed, etc. In addition, the data access component 202 can access executable code of that subject application. For example, the data access component 202 might access executable code instructions that are included in the historic data (e.g., as part of a trace, snapshot, etc.), or access executable code from the application itself (e.g., a binary image corresponding to application 104c).

The diagnostic code identification component 203 identifies diagnostic code that is to be executed in connection with the executable code that was accessed by the data access component 202. The diagnostic code identification component 203 is shown as potentially including functionality for generating diagnostic code (i.e., diagnostic code generation component 203a). The diagnostic code generation component 203a might, for example, automatically generate diagnostic code based on user interactions at a user interface (UI), based on instructions from some other software component, based on an analysis of the execution data 103e/104e (e.g., by a machine learning algorithm), etc.

For example, based on a selection of a code element in a debugger UI, the diagnostic code generation component 203a might generate diagnostic code that collects diagnostic data relating to that code element, when executed. For instance, the generated diagnostic code could include trace statement(s) that collect data value(s) corresponding to a code element (e.g., variable, data structure, or memory location) that is selected in a UI or that is identified by some other software component, that log the execution of a loop that is selected in a UI or that is identified by some other software component, that log the calling of a function that is selected in a UI or that is identified by some other software component, and the like.

As alluded to, instructions might be received from some other software component. In embodiments, the diagnostics component 201 might expose a historic program execution to other components as if it was a live target. This way tools, like debuggers and profilers, can interact with the historic program execution via normal application programming interface (API) calls as if they were interacting with a live process, when in reality they are interacting with a prior recorded execution. Thus, tools might be unaware that they are interacting with a historic program execution, and not a live process. For example, a profiler might make calls to the diagnostics component 201 to add instrumentation code to a historic program execution in the same way that it would live process, without awareness that it is interacting with a historic program execution.

In addition (or as an alternative) to trace statements, the generated diagnostic code could collect many other types of diagnostic data. For example, diagnostic data might include snapshot(s) of any relevant runtime data, such as registers, a thread's heap memory, a thread's stack, etc. Additionally, or alternatively, diagnostic data might include performance data, such data collected by using timers to determine how much time it takes to complete execution of one or more sections of code (e.g., in terms of instruction counts, wall-clock time, etc.). Additionally, or alternatively, diagnostic data might include dependency data, such as variable dependencies or component dependencies. In the case of component dependencies (e.g., in which components could be functions, libraries, classes, etc.), diagnostic data could include information about the boundaries between components, such as data value(s) passed to a component when calling the component and/or any data value(s) returned by the component. Additionally, or alternatively, diagnostic data might include control flow information, such as branch traces, call graphs, etc. Additionally, or alternatively, diagnostic data might include code coverage information.

The diagnostic code generation component 203a could even generate diagnostic code that overrides a historic value or behavior of a code element. For instance, generated diagnostic code might change a historic value of a code element (e.g., variable, data structure, or memory location) selected in a UI or that is identified by some other software component, might change the historic outcome of a conditional statement corresponding to a code element that is selected in a UI or that identified by some other software component, might change the historic target of a branch statement corresponding to a code element that is selected in a UI or that identified by some other software component, and the like.

The diagnostic code identification component 203 is also shown as potentially including functionality for receiving diagnostic code as input (i.e., diagnostic code input component 203b). The diagnostic code input component 203b receives express input of diagnostic code from a user or from some other software component (e.g., a debugger or a profiler making API calls to the diagnostics component 201). Similar to generated diagnostic code, any received diagnostic code might generate diagnostic data, might override one or more data value(s), might override one or more execution behaviors (e.g., the outcome of conditions, that targets of branches, etc.), and the like.

The execution component 204 executes subject executable code that was accessed by the data access component 202 (e.g., code of application 104c) based on the historic data accessed by the data access component 202. The execution component 204 can rely on any mechanism that can recover the state of the program at the point where diagnostics code needs to be added. For example, one mechanism might rely on a dump (e.g., memory and registers) at every instruction of a program to recover such state. More typically, however, the execution component 204 can use the code executer 104b to virtually execute the code of application 104c—for example, by emulating execution of one or more code instructions of application 104c, while guiding those instructions' execution using the execution data 103e/104e to the point where diagnostics code needs to be added (and beyond). In this example, the execution component 204 might supply individual code instructions with register and/or memory values obtained from the execution data 103e/104e, the execution component 204 might control the outcome of branches based on branch taken/not take information obtained from the execution data 103e/104e, etc. The particular manner in which the execution component 204 uses the code executor 104b to execute subject code can vary depending on the nature of that code. For example, if the subject code is native code (e.g., machine code instructions configured for execution directly on processor(s) 102), this code might be virtually executed on a native code interpreter. If the subject code is managed code (e.g., intermediary language instructions), this code might be executed by a managed runtime environment.

The instrumentation component 205 causes the diagnostic code that was obtained or generated by the diagnostic code identification component 103 to be executed during the execution of the subject executable code by the execution component 204. For example, if the subject code is native code that is being interpreted by a native code interpreter, the instrumentation component 205 might inject the diagnostic code into the code steam of the subject code, so that it is interpreted along with the subject code. In this situation, it will be appreciated that the diagnostic code may also comprise native code.

On the other hand, if the subject code is managed code that is being executed by a managed runtime environment, the instrumentation component 205 might pass the diagnostic code to the managed runtime for execution by the managed runtime along with the subject code. In this situation, it will be appreciated that the diagnostic code might comprise managed source code that is passed to the managed runtime for compiling and execution within the code stream of the subject code.

In embodiments, the diagnostic code could even be executed based on a hook into an interpreter or managed runtime. For example, the instrumentation component 205 could configure the interpreter or managed runtime to watch for execution of a particular code instruction of the subject application. When this code instruction is executed by the execution component 204, the interpreter or managed runtime could execute the diagnostic code within the code stream of the subject code (e.g., within a historical debugger's runtime model), or separate from the subject code (e.g., separate from the debugger's runtime model). If the diagnostic code is executed separate from the subject code based on a hook, it might be executed by a managed runtime, or might be interpreted so that it appears (i.e., from the perspective of the diagnostic code) to be executed by the managed runtime when it is actually executing outside of the managed runtime. If the diagnostic code is executed separate from the subject code based on a hook, it will be appreciated that diagnostic code could potentially be in a language entirely different than the subject code.

The diagnostic output component 206 provides the results of having executed the diagnostic code to a file, to a user (e.g., in a user interface), or to some other software component. For example, if the diagnostic code generated diagnostic data (e.g., the value(s) of some code element or memory location, data providing an indication of what subject code executed, etc.), the diagnostic output component 206 might facilitate writing this data to a file, outputting the data within a user interface, communicating the data to some other component such as a profiler, etc. If the diagnostic code overrode a value or execution behavior, the diagnostic output component 206 might facilitate presenting the results of this override within a user interface (e.g., enabling for users to engage in "what-if" analysis of the subject code), or pass that data to some other component such as a profiler.

Figure 3:
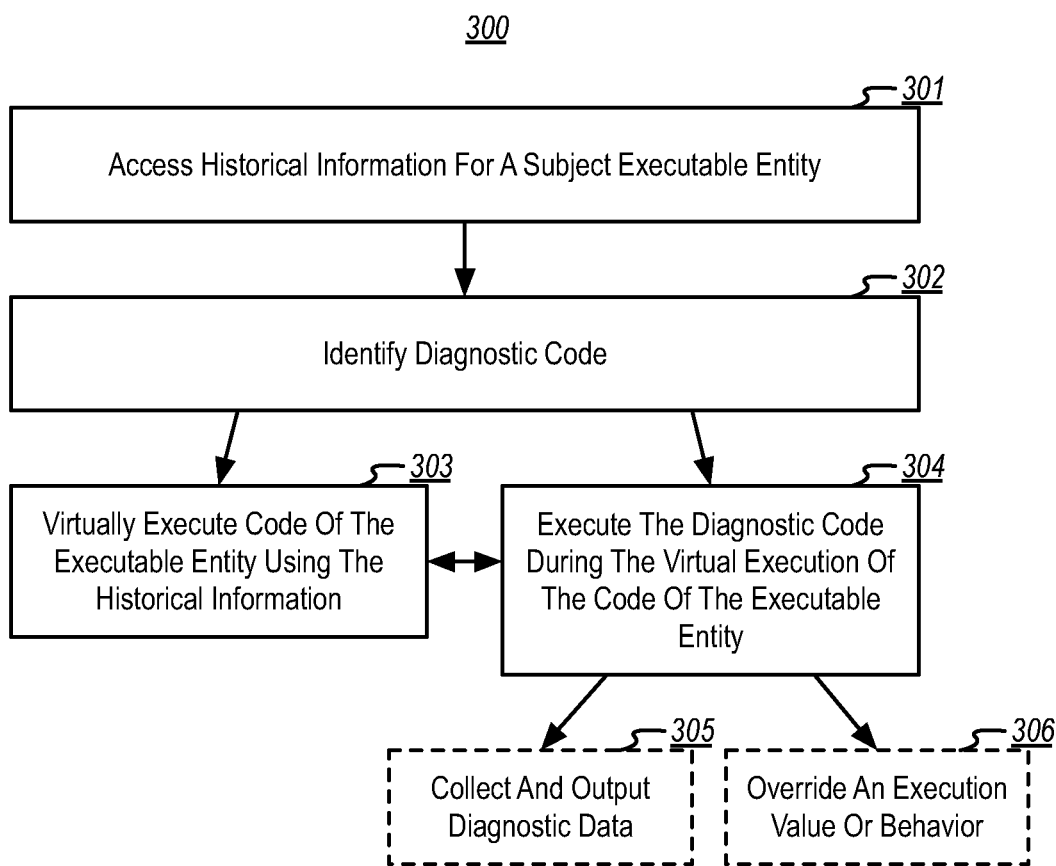
FIG. 3 illustrates a flowchart of an example method for dynamically instrumenting code that executes based on a historic execution of a subject executable entity.

In view of the foregoing, FIG. 3 illustrates a flowchart of an example method 300 of dynamically instrumenting code that executes based on a historic execution of a subject executable entity. Method 300 will now be described in view of the FIGS. 1 and 2.

As shown in FIG. 3, method 300 includes an act 301 of accessing historical information for a subject executable entity. In some embodiments, act 301 comprises accessing historic execution information for a subject executable entity, the historic execution information including execution state information for at least one point in time in the historic execution the executable entity. For example, the data access component 202 can access execution data 104e, which records data about a historic execution of application 104c. As discussed, execution data 104e records state of that prior execution for at least one point in time, and could include for example, trace data enabling time-travel debugging, a dump or snapshot enabling branch trace debugging, a plurality of snapshots enabling replay and snapshot debugging, a single snapshot (e.g., of a live process) from which a virtual execution can be continued, etc.

Method 300 also includes an act 302 of identifying diagnostic code. In some embodiments, act 302 comprises identifying one or more diagnostic code instructions for instrumenting one or more subject code instructions of the executable entity. For example, the diagnostic code identification component 203 can identify diagnostic code for instrumenting into code of application 104c. As discussed, the diagnostic code could be generated (e.g., using the diagnostic code generation component 203a, or could be received from a user or some other software component (e.g., using the diagnostic code input component 203b). Notably, the subject code instructions (e.g., of application 104c) might be obtained from execution data 104e and/or from the executable entity, itself (e.g., from an application binary). Thus, in act 302, the one or more subject code instructions of the executable entity might be accessed from at least one of the historic execution information or a binary image from which the executable entity executed.

Method 300 also includes an act 303 of virtually executing code of the executable entity using the historical information. In some embodiments, act 303 comprises virtually executing the one or more subject code instructions of the executable entity, based at least on supplying the one or more subject code instructions of the executable entity with data from the historic execution information. For example, the execution component 204 can use the code executer 104b to virtually execute code of application 104c based on execution data 104e. While the code executer 104b might be a separate component from the execution component 204, it might also be part of the execution component 204. As will be appreciated in view of the prior discussion of the execution component 204 and the code executer 104b, virtually executing the subject code instructions could include executing the subject code instructions using a managed code runtime, or executing the subject code instructions using a native code interpreter.

Concurrent to act 303, method 300 also includes an act 304 of executing the diagnostic code during the virtual execution of the code of the executable entity. In some embodiments, act 304 comprises, while virtually executing the one or more subject code instructions of the executable entity, executing the identified one or more diagnostic code instructions. For example, the instrumentation component 205 can execute the diagnostic code identified in act 302, in connection with virtual execution the code of application 104c in act 303. In embodiments, act 304 could comprise injecting the diagnostic code into the code stream of application 104c, virtually executing the diagnostic code with the code of application 104c. Thus, if the code of application 104c is managed code, act 304 could comprise executing the identified one or more diagnostic code instructions by injecting the one or more diagnostic code instructions into the one or more subject code instructions, and executing the one or more diagnostic code instructions and the one or more subject code instructions in a managed runtime. If the code of application 104c is native code, act 304 could comprise executing the identified one or more diagnostic code instructions by injecting the one or more diagnostic code instructions into the one or more subject code instructions, and virtually executing the one or more diagnostic code instructions and the one or more subject code instructions in a native code interpreter.

In other embodiments, the diagnostic code could be executed as part of a hook. Thus, act 304 could comprise executing the identified one or more diagnostic code instructions by executing the identified one or more diagnostic code instructions based on triggering of an execution hook (which could, for example, be triggered based on virtually executing a particular second instruction). In this situation, the diagnostic code instructions might be executed natively, or might be virtually executed.

Based on execution of the diagnostic code in act 304, method might include an act 305 of collecting and outputting diagnostic data. In some embodiments, act 305 comprises, based on executing the identified one or more diagnostic code instructions, collecting diagnostic data regarding the virtual execution of the one or more subject code instructions. For example, the diagnostic code identified in act 302 might include one or more trace statements that collect diagnostic data relating to a given code element (e.g., variable, data structure, loop, function, etc.), when executed. In this case, diagnostic output component 206 can output any data that was generated by these trace statement(s) to a file, to a user interface, and/or to another software component. Thus, act 302 might comprise collecting diagnostic data including, for example, data regarding control flow of the one or more subject code instructions, at least one data value obtained from the historic execution information, at least one data value generated by the virtual execution of the one or more subject code instructions, a snapshot of a heap used for executing the one or more subject code instructions, performance data relating to execution of the one or more subject code instructions, timing information, etc.

Additionally, or alternatively, based on execution of the diagnostic code in act 304, method might include an act 306 of overriding an execution value or behavior. In some embodiments, act 306 comprises, based on executing the identified one or more diagnostic code instructions, overriding at least one of a value or an execution behavior of the one or more subject code instructions. For example, the diagnostic code identified in act 302 might include diagnostic code that, when executed, alters a variable or memory value or that alters execution flow. In this case, the diagnostic output component 206 can output any results from the override (e.g., by showing how execution changed based on the override, facilitating "what-if" analysis). As such, it will be appreciated that act 306 might comprise overriding a data value supplied as an input to at least one of the one or more subject code instructions, overriding a data value generated as an output by at least one of the one or more subject code instructions, altering a target jump location for at least one of the one or more subject code instructions, and the like.

Accordingly, the embodiments described herein enable additional diagnostic code—which was not originally included in a subject application's code—to be executed in connection with re-executing the subject applications' code based on historic execution information. As such, this additional diagnostic code can be executed within the context of the subject application's prior execution state, in order to generate diagnostic information that was not originally generated by the subject application during its prior execution, or that would not have been generated by the application had it continued executing. As such, the embodiments described herein can enable the code that executes as part of an application to be and instrumented with new diagnostic code, in order to provide new data about a prior execution of the application, without modifying the application itself. Thus, if an undesired software behavior occurred during a prior execution of the application, or if the undesired software behavior would have occurred had the prior execution have continued, the new diagnostic code might be able to provide insights into that undesired software behavior and/or its root cause. Additionally, or alternatively, the new diagnostic code might even override how the application's code would have normally executed based on the prior execution state (e.g., by overriding a historic data value, by overriding the historic outcome of a condition, by overriding the historic target of a branch, etc.), facilitating "what-if" analysis.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for dynamically instrumenting code of a subject executable entity that is executing based on replaying a prior execution of the subject executable entity from a trace, the method comprising:
    accessing historic execution information recording a prior execution of the subject executable entity, the historic execution information including execution state information for at least one point in the prior execution of the subject executable entity that is usable to replay the at least one point in the prior execution of the subject executable entity;
    based at least on accessing the historic execution information, identifying one or more diagnostic code instructions for instrumenting one or more subject code instructions of the subject executable entity during replay of the subject executable entity, the one or more diagnostic code instructions having not been originally executed as part of a code stream of the subject executable entity during the prior execution of the subject executable entity;
    replaying the prior execution of the subject execution entity by virtually executing the one or more subject code instructions of the subject executable entity using the historic execution information, including supplying the one or more subject code instructions of the subject executable entity with data from the historic execution information, wherein virtually executing the one or more subject code instructions of the subject executable entity using the historic execution information establishes a prior execution context based on the historic execution information;
    in connection with virtually executing the one or more subject code instructions of the subject executable entity using the historic execution information, executing the identified one or more diagnostic code instructions within the established prior execution context as part of the code stream of the subject executable entity; and
    based on executing the identified one or more diagnostic code instructions within the established prior execution context, performing at least one of:
        collecting diagnostic data regarding the virtual execution of the one or more subject code instructions of the subject executable entity; or
        overriding at least one of a value or an execution behavior of the one or more subject code instructions of the subject executable entity.

2. The method of claim 1, wherein the historic execution information comprises at least one of:
    trace data enabling time-travel debugging;
    a dump or snapshot enabling branch trace debugging;
    a plurality of snapshots enabling replay and snapshot debugging; or
    a single snapshot from which a virtual execution can be continued.

3. The method of claim 1, wherein the one or more subject code instructions of the subject executable entity are accessed from least one of (i) the historic execution information, or (ii) a binary image from which the subject executable entity executed.

4. The method of claim 1, wherein virtually executing the one or more subject code instructions of the subject executable entity comprises at least one of (i) executing the one or more subject code instructions using a managed code runtime, or (ii) executing the one or more subject code instructions using a native code interpreter.

5. The method of claim 1, wherein executing the identified one or more diagnostic code instructions comprises at least one of:
    executing the identified one or more diagnostic code instructions based on triggering of an execution hook;
    injecting the one or more diagnostic code instructions into the code stream of the subject executable entity, the code stream including the one or more subject code instructions of the subject executable entity, and executing the one or more diagnostic code instructions and the one or more subject code instructions in a managed runtime; or
    injecting the one or more diagnostic code instructions into the code stream of the subject executable entity, the code stream including the one or more subject code instructions, and executing the one or more diagnostic code instructions and the one or more subject code instructions in a native code interpreter.

6. The method of claim 5, wherein executing the identified one or more diagnostic code instructions based on triggering of the execution hook comprises at least one of:
    executing the one or more diagnostic code instructions by a managed runtime; or interpreting the one or more diagnostic code instructions so they appear to be executed by the managed runtime when they actually execute outside of the managed runtime.

7. The method of claim 1, wherein the method collects the diagnostic data regarding the virtual execution of the one or more subject code instructions of the subject executable entity, the diagnostic data including at least one of:
   data regarding control flow of the one or more subject code instructions;
   at least one data value obtained from the historic execution information;
   at least one data value generated by the virtual execution of the one or more subject code instructions;
   a snapshot of a heap used for executing the one or more subject code instructions; or
   performance data relating to execution of the one or more subject code instructions.

8. The method of claim 1, wherein the method overrides at least one execution behavior of the one or more subject code instructions of the subject executable entity based on at least one of:
   overriding a data value supplied as an input to at least one of the one or more subject code instructions;
   overriding a data value generated as an output by at least one of the one or more subject code instructions; or
   altering a target jump location for at least one of the one or more subject code instructions.

9. The method of claim 1, wherein the one or more diagnostic code instructions perform at least one of: collecting a data value corresponding to an identified code element, logging execution of an identified loop, or logging calling of an identified function.

10. A computer system, comprising:
    one or more processors; and
    one or more computer-readable media having stored thereon computer-executable instructions that are executable by the one or more processors to cause the computer system to dynamically instrument code of a subject executable entity that is executing based on replaying a prior execution of the subject executable entity from a trace, the computer-executable instructions including instructions that are executable by the one or more processors to:
       access historic execution information recording a prior execution of the subject executable entity, the historic execution information including execution state information for at least one point in the prior execution of the subject executable entity that is usable to replay the at least one point in the prior execution of the subject executable entity;
       based at least on accessing the historic execution information, identify one or more diagnostic code instructions for instrumenting one or more subject code instructions of the subject executable entity during replay of the subject executable entity, the one or more diagnostic code instructions having not been originally executed as part of a code stream of the subject executable entity during the prior execution of the subject executable entity;
       replay the prior execution of the subject execution entity by virtually executing the one or more subject code instructions of the subject executable entity using the historic execution information, including supplying the one or more subject code instructions of the subject executable entity with data from the historic execution information, wherein virtually executing the one or more subject code instructions of the subject executable entity using the historic execution information establishes a prior execution context based on the historic execution information;
       in connection with virtually executing the one or more subject code instructions of the subject executable entity using the historic execution information, execute the identified one or more diagnostic code instructions within the established prior execution context as part of the code stream of the subject executable entity; and
       based on executing the identified one or more diagnostic code instructions within the established prior execution context, perform at least one of:
          collecting diagnostic data regarding the virtual execution of the one or more subject code instructions of the subject executable entity; or
          overriding at least one of a value or an execution behavior of the one or more subject code instructions of the subject executable entity.

11. The computer system of claim 10, wherein the historic execution information comprises at least one of:
    trace data enabling time-travel debugging;
    a dump or snapshot enabling branch trace debugging;
    a plurality of snapshots enabling replay and snapshot debugging; or
    a single snapshot from which a virtual execution can be continued.

12. The computer system of claim 10, wherein the one or more subject code instructions of the subject executable entity are accessed from least one of (i) the historic execution information, or (ii) a binary image from which the subject executable entity executed.

13. The computer system of claim 10, wherein virtually executing the one or more subject code instructions of the subject executable entity comprises at least one of (i) executing the one or more subject code instructions using a managed code runtime, or (ii) executing the one or more subject code instructions using a native code interpreter.

14. The computer system of claim 10, wherein executing the identified one or more diagnostic code instructions comprises at least one of:
    executing the identified one or more diagnostic code instructions based on triggering of an execution hook;
    injecting the one or more diagnostic code instructions into the code stream of the subject executable entity, the code stream including the one or more subject code instructions of the subject executable entity, and executing the one or more diagnostic code instructions and the one or more subject code instructions in a managed runtime; or
    injecting the one or more diagnostic code instructions into the code stream of the subject executable entity, the code stream including the one or more subject code instructions, and executing the one or more diagnostic code instructions and the one or more subject code instructions in a native code interpreter.

15. The computer system of claim 10, wherein the computer system collects the diagnostic data regarding the virtual execution of the one or more subject code instructions of the subject executable entity, the diagnostic data including at least one of:
    data regarding control flow of the one or more subject code instructions;
    at least one data value obtained from the historic execution information;

at least one data value generated by the virtual execution of the one or more subject code instructions;

a snapshot of a heap used for executing the one or more subject code instructions; or performance data relating to execution of the one or more subject code instructions.

16. The computer system of claim 10, wherein the computer system overrides at least one execution behavior of the one or more subject code instructions of the subject executable entity based on at least one of:

overriding a data value supplied as an input to at least one of the one or more subject code instructions;

overriding a data value generated as an output by at least one of the one or more subject code instructions; or altering a target jump location for at least one of the one or more subject code instructions.

17. One or more hardware storage devices having stored thereon computer-executable instructions that are executable by one or more processors to cause a computer system to dynamically instrument code of a subject executable entity that is executing based on replaying a prior execution of the subject executable entity from a trace, the computer-executable instructions including instructions that are executable by the one or more processors to:

access historic execution information recording a prior execution of the subject executable entity, the historic execution information including execution state information for at least one point in the prior execution of the subject executable entity that is usable to replay the at least one point in the prior execution of the subject executable entity;

based at least on accessing the historic execution information, identify one or more diagnostic code instructions for instrumenting one or more subject code instructions of the subject executable entity during replay of the subject executable entity, the one or more diagnostic code instructions having not been originally executed as part of a code stream of the subject executable entity during the prior execution of the subject executable entity;

replay the prior execution of the subject execution entity by virtually executing the one or more subject code instructions of the subject executable entity using the historic execution information, including supplying the one or more subject code instructions of the subject executable entity with data from the historic execution information, wherein virtually executing the one or more subject code instructions of the subject executable entity using the historic execution information establishes a prior execution context based on the historic execution information;

in connection with virtually executing the one or more subject code instructions of the subject executable entity using the historic execution information, execute the identified one or more diagnostic code instructions within the established prior execution context as part of the code stream of the subject executable entity; and based on executing the identified one or more diagnostic code instructions within the established prior execution context, perform at least one of:

collecting diagnostic data regarding the virtual execution of the one or more subject code instructions of the subject executable entity; or overriding at least one of a value or an execution behavior of the one or more subject code instructions of the subject executable entity.

18. The one or more hardware storage devices of claim 17, wherein the historic execution information comprises at least one of:

trace data enabling time-travel debugging;

a dump or snapshot enabling branch trace debugging;

a plurality of snapshots enabling replay and snapshot debugging; or a single snapshot from which a virtual execution can be continued.

19. The one or more hardware storage devices of claim 17, wherein the one or more subject code instructions of the subject executable entity are accessed from least one of (i) the historic execution information, or (ii) a binary image from which the subject executable entity executed.

20. The one or more hardware storage devices of claim 17, wherein virtually executing the one or more subject code instructions of the subject executable entity comprises at least one of (i) executing the one or more subject code instructions using a managed code runtime, or (ii) executing the one or more subject code instructions using a native code interpreter.

21. The one or more hardware storage devices of claim 17, wherein executing the identified one or more diagnostic code instructions comprises at least one of:

executing the identified one or more diagnostic code instructions based on triggering of an execution hook;

injecting the one or more diagnostic code instructions into the one or more subject code instructions of the subject executable entity, and executing the one or more diagnostic code instructions and the one or more subject code instructions in a managed runtime; or injecting the one or more diagnostic code instructions into the one or more subject code instructions, and executing the one or more diagnostic code instructions and the one or more subject code instructions in a native code interpreter.

* * * * *